United States Patent
La Fratta et al.

(10) Patent No.: US 11,175,859 B1
(45) Date of Patent: Nov. 16, 2021

(54) MANAGING MEMORY COMMANDS IN A MEMORY SUBSYSTEM BY ADJUSTING A MAXIMUM NUMBER OF LOW PRIORITY COMMANDS IN A DRAM CONTROLLER

(71) Applicant: Micron Technology, Inc., Boise, ID (US)

(72) Inventors: Patrick A. La Fratta, McKinney, TX (US); Laurent Isenegger, Morgan Hill, CA (US); Robert M. Walker, Raleigh, NC (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/929,008

(22) Filed: Jul. 14, 2020

(51) Int. Cl.
*G06F 3/06* (2006.01)
*G06F 9/48* (2006.01)

(52) U.S. Cl.
CPC .......... *G06F 3/0659* (2013.01); *G06F 3/0613* (2013.01); *G06F 3/0653* (2013.01); *G06F 3/0673* (2013.01); *G06F 9/4881* (2013.01)

(58) Field of Classification Search
CPC .... G06F 3/0659; G06F 3/0613; G06F 3/0653; G06F 3/0673; G06F 9/4881
See application file for complete search history.

(56) References Cited

U.S. PATENT DOCUMENTS

| 7,281,086 | B1* | 10/2007 | More | G06F 3/061 |
| | | | | 710/39 |
| 8,341,300 | B1* | 12/2012 | Karamcheti | G06F 13/1642 |
| | | | | 710/6 |
| 2008/0222640 | A1* | 9/2008 | Daly | G06F 9/4881 |
| | | | | 718/103 |
| 2015/0055468 | A1* | 2/2015 | Agarwal | H04L 47/2475 |
| | | | | 370/232 |
| 2019/0056870 | A1* | 2/2019 | Sun | G06F 3/0611 |

* cited by examiner

*Primary Examiner* — Nicholas J Simonetti
(74) *Attorney, Agent, or Firm* — Nicholson De Vos Webster & Elliott LLP

(57) ABSTRACT

A method is described for managing issuance of memory commands. The method includes determining whether a number of high priority commands from a cache controller meets a first threshold. In response to meeting the first threshold, a second threshold, which indicates a maximum number of low priority commands allowed in a low latency memory command queue, is set to a first value. In response to not meeting the first threshold, the second threshold is set to a second value. The method further selects a memory command for issuance from the cache controller command queue, wherein the memory command is a high priority memory command when the number of low priority memory commands stored in the low latency memory controller command queue meets the second threshold and is a low priority memory command when the number of low priority memory commands does not meet the second threshold.

20 Claims, 11 Drawing Sheets

US 11,175,859 B1

MANAGING MEMORY COMMANDS IN A MEMORY SUBSYSTEM BY ADJUSTING A MAXIMUM NUMBER OF LOW PRIORITY COMMANDS IN A DRAM CONTROLLER

TECHNICAL FIELD

The present disclosure generally relates to managing memory commands, and more specifically, relates to managing memory commands in a memory subsystem with a high latency backing store by adjusting a maximum number of low priority commands that can be issued to a dynamic random access memory (DRAM) controller.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
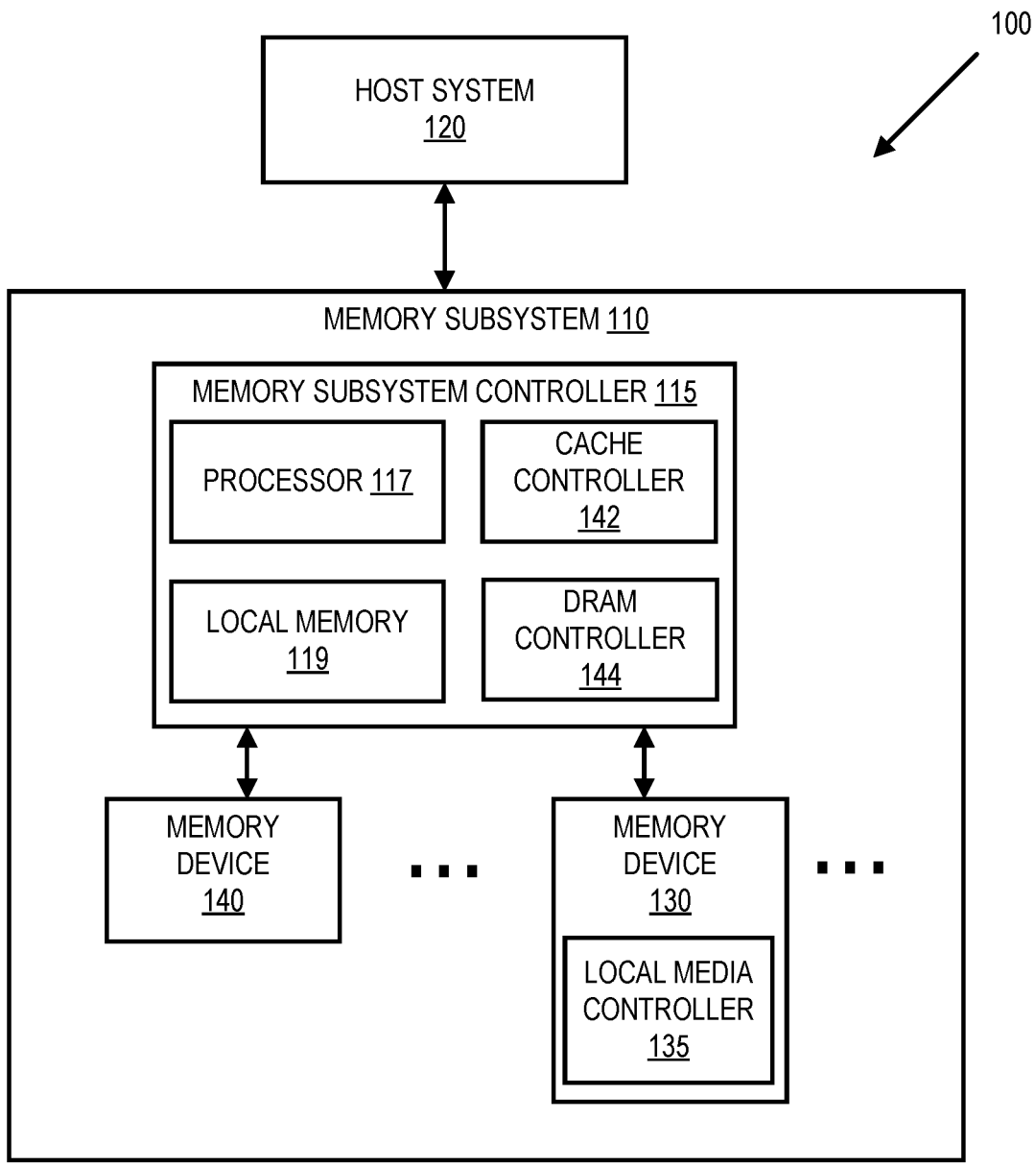
FIG. 1 illustrates an example computing system that includes a memory subsystem, in accordance with some embodiments of the present disclosure.

Aspects of the present disclosure are directed to efficient scrambling and encoding for memory operations, including copyback procedures in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Memory subsystems provide host systems access to data. In particular, a host system can request to read data from or write data to a set of memory devices. A memory subsystem thereafter processes these requests and, in response to a read memory request (sometimes referred to as a read command or a read memory command), provides the requested data to the host system or, in response to a write memory request (sometimes referred to as a write command or a write memory command), writes the provided data to the memory devices. To efficiently process requests from host systems, the memory subsystem may rely on a set of caches. In particular, data destined or currently stored in a set of high latency memory devices (sometimes referred to as a backing store) may be stored in a lower latency cache store. Accordingly, the memory subsystem may access the data from the cache store (e.g., read data from the cache store or write data to the cache store, which will eventually be flushed to the memory devices) instead of accessing data directly from the high latency memory devices. Since the cache store provides a lower latency in comparison to the memory devices (e.g., lower read and/or write times), the memory subsystem may process host system requests in an efficient manner by relying on the cache store. Further, to maintain concurrency of memory operations, the memory subsystem can cache requests until the memory subsystem has an opportunity to issue and fulfill the requests.

Some portions of the above-described efficiency in relation to use of caches will be apparent to the host system, while some portions will not be readily apparent. Namely, a host system will directly benefit from increased efficiency in relation to read requests originating from the host system since the memory subsystem will provide data in response to these read requests with reduced delay when using the low latency cache store in comparison to accessing the data directly from the high latency memory devices. This increased speed in responding to read requests originating from the host system allows the host system to consequently increase the speed of processing that is reliant on the requested data. Although greater read efficiency associated with read requests originating from the host systems provides efficiency improvements to the host systems, greater write efficiency will typically not be apparent to the host systems as write requests do not typically impact processing on the host systems. Namely, processing activities on the host system are typically not impacted when a write request is fulfilled by the memory subsystem, as the memory subsystem does not wait for fulfillment of the write request before further proceeding with processing activities. Further, efficiency improvements to processing read or write requests originating from within the memory subsystem (e.g., read requests as a result of evictions and cleans from the cache store to the memory devices or fills that are a result of a prefetch) will typically not be apparent to the host systems as these requests are transparent to the host systems.

Some memory subsystems can store memory requests in a cache store command queue in the order the memory subsystem receives these requests. The memory subsystem can consider dependencies between the requests such that dependent requests (e.g., requests that access the same sector, line, or other unit of access from the memory devices or cache) are issued together or successively. However, issuing requests based on order of receipt, even with consideration for dependencies, may not provide noticeable performance improvements for host systems, including improved QoS. Namely, these techniques treat each type of memory request (e.g., read requests and write requests) identically and without respect to their origin such that improving QoS for the host systems is not prioritized.

Accordingly, memory subsystems can prioritize read requests originating from host systems to provide greater processing improvements to host systems. In particular, instead of processing memory requests in the order in which the memory subsystem receives or generates the requests, the memory subsystem can place some preference on processing read requests originating from host systems over other pending memory requests (e.g., write requests from the host system and read and write requests from other sources) while still honoring memory request dependencies. In particular, as a memory request is received by a cache controller of the memory subsystem, the cache controller adds the memory request into a cache controller command queue. The cache controller command queue stores the memory request along with a priority indication, which indicates whether the memory request is a high priority or a low priority request. The cache controller sets the newly received request to a high priority if (1) the memory request is a read request received from a host system or (2) a high priority request depends from the newly received request (e.g., requests that access the same sector, line, or other unit of access from the memory devices or cache). The cache controller can periodically iterate the cache controller command queue to select a memory command for issuance to a Dynamic Random-Access Memory (DRAM) controller with consideration to the priority of the memory requests. In particular, the DRAM controller can issue and fulfill received memory requests with selective prioritization of high priority requests, including read requests received from host system, based on a high priority flag (i.e., the DRAM controller prioritizes high priority commands when the high priority flag is set). To ensure the memory subsystem does not ignore low priority requests, the cache controller can alternate issuance of low and high priority requests to the DRAM controller when both types of requests are available. However, the cache controller can ensure that low priority requests are not overly represented in the DRAM controller by setting a maximum number of low priority memory requests that can be outstanding in the DRAM controller. If the maximum number of low priority memory requests that can be outstanding in the DRAM controller is met, the cache controller will not issue a low priority request until a low priority request is fulfilled and is consequently removed from the DRAM controller.

The use of a threshold value to control issuance of memory requests to the DRAM controller (e.g., the maximum number of low priority memory requests that can be outstanding in the DRAM controller) maintains a priority for high priority requests in the memory subsystem. However, this priority might prove overly stringent when there are no high priority memory requests in the cache controller awaiting issuance to the DRAM controller. In particular, low priority requests will remain in the cache controller when (1) there are no high priority memory requests in the cache controller command queue, (2) there are low priority memory requests in the cache controller command queue, and (3) there is availability/room in the DRAM controller command queue for additional memory requests.

Aspects of the present disclosure address the above and other deficiencies by dynamically modifying the maximum number of low priority memory requests that can be outstanding in the DRAM controller. In particular, the cache controller determines whether the number of high priority commands in the cache controller command queue is less than or equal to a watermark threshold. In response to determining that the number of high priority commands in the cache controller command queue is less than or equal to the watermark threshold, the cache controller sets the maximum number of low priority memory requests that can be outstanding in the DRAM controller to a predefined high value. Conversely, in response to determining that the number of high priority commands in the cache controller command queue is not less than or equal to the watermark threshold (i.e., is greater than the threshold), the cache controller sets the maximum number of low priority memory requests that can be outstanding in the DRAM controller to a predefined low value. Accordingly, when there are few high priority requests in the cache controller command queue, the memory subsystem allows for more low priority requests in the DRAM controller. However, when there are comparatively many high priority requests in the cache controller command queue, the memory subsystem allows for fewer low priority requests in the DRAM controller such that high priority requests are given priority. More details of this memory request policy will be described by way of example below.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM), synchronous dynamic random access memory (SDRAM), and other types of low latency memory.

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a cache controller 142 and a DRAM controller 144 that can selectively issue and fulfill read requests/commands that issue from a host system 120 to increase quality of service (QoS) to the host system 120 (e.g., reduce latency in relation to fulfillment of read requests originating from the host system 120). In some embodiments, the controller 115 includes at least a portion of the cache controller 142 and/or the DRAM controller 144. For example, the controller 115 can include a processor 117 (processing device) configured to execute instructions stored in local memory 119 for performing the operations described herein. In some embodiments, the cache controller 142 and/or the DRAM controller 144 is part of the host system 110, an application, or an operating system.

In some embodiments, the DRAM controller 144 can reside inside the memory subsystem controller 115, as shown in FIG. 1, while in other embodiments, the DRAM controller 144 can reside outside the memory subsystem controller 115. For example, the DRAM controller 144 can be implemented within the memory device 140 (e.g., the DRAM controller 144 can be implemented as a local media controller within the memory device 140) or otherwise outside the memory subsystem controller 115 (e.g., the DRAM controller 144 is outside the memory subsystem controller 115 and the memory device 140 but manages the memory device 140). Accordingly, placement of the DRAM controller 144 can vary and depictions and/or descriptions of the DRAM controller 144 within the memory subsystem controller 115 does not limit operations of the memory subsystem 110.

The cache controller 142 and/or the DRAM controller 144 can selectively issue and fulfill read requests that issue from a host system 120 to increase QoS to the host system 120. Further details with regards to the operations of the cache controller 142 and/or the DRAM controller 144 are described below.

Figure 2A:
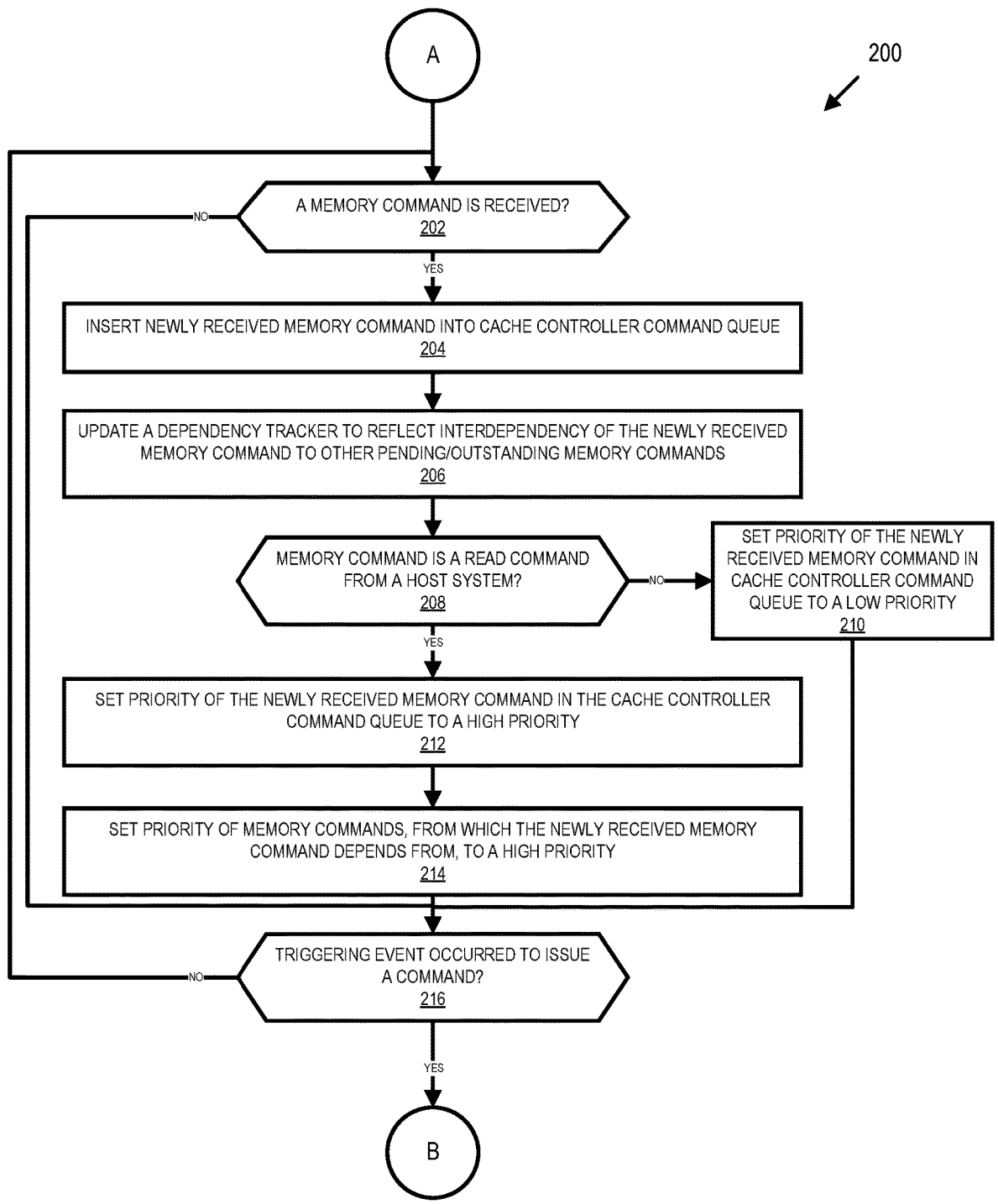
FIGS. 2A and 2B show a flow diagram of an example method to manage the issuance and fulfillment of memory commands, in accordance with some embodiments of the present disclosure.
Figure 2B:
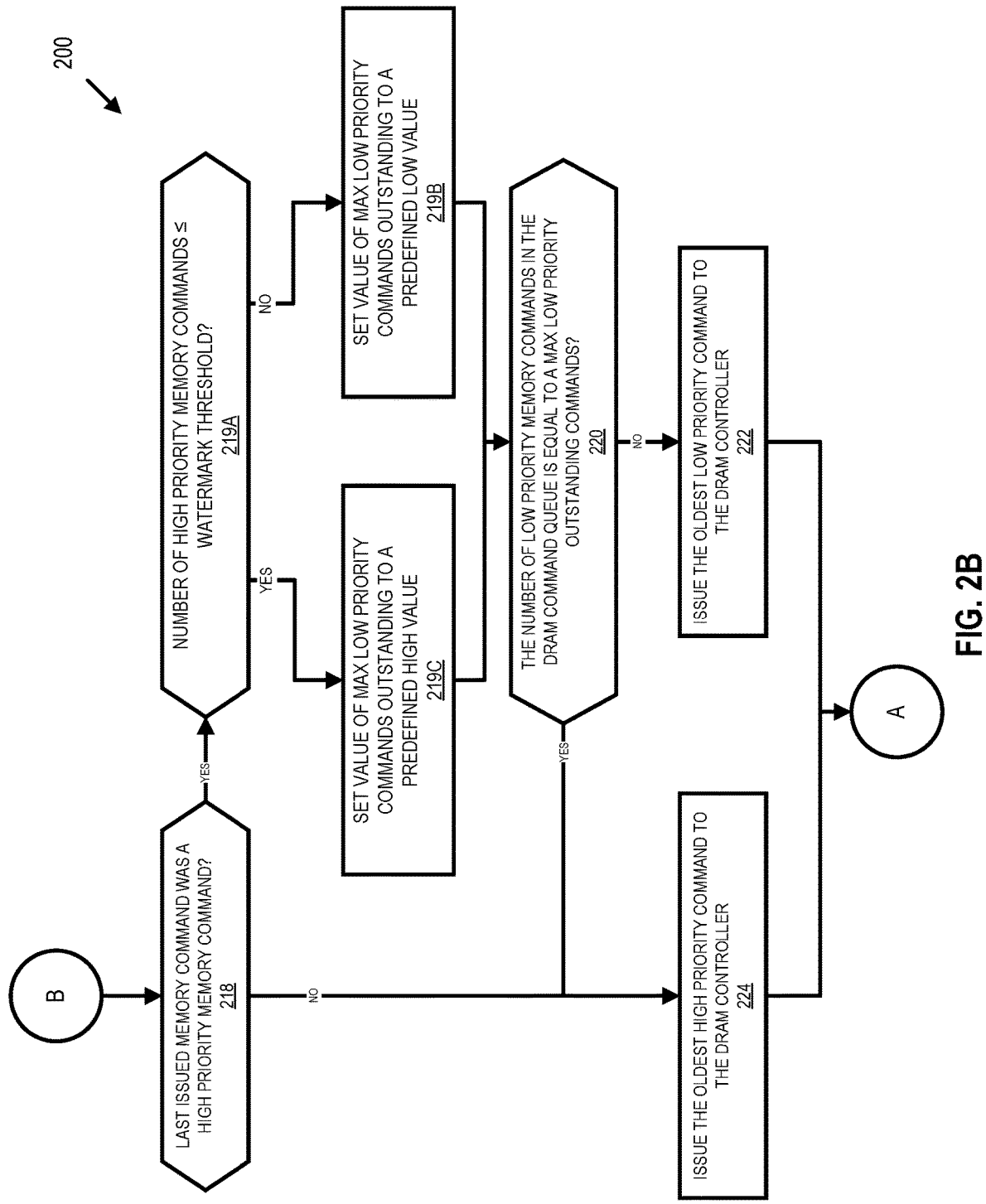

FIGS. 2A and 2B show a flow diagram of an example method 200 to manage the issuance and fulfillment of memory commands with the dynamic adjustment of a maximum number of low priority memory requests that can be outstanding in the DRAM controller 144, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the cache controller 142 and/or the DRAM controller 144 of FIG. 1. Although shown in a particular sequence or order, unless otherwise specified, the order of the processes/operations can be modified. Thus, the illustrated embodiments should be understood only as examples, and the illustrated processes/operations can be performed in a different order, and some processes/operations can be performed in parallel. Additionally, one or more processes/operations can be omitted in various embodiments. Thus, not all processes/operations are required in every embodiment. Other flows are possible.

Figure 3:
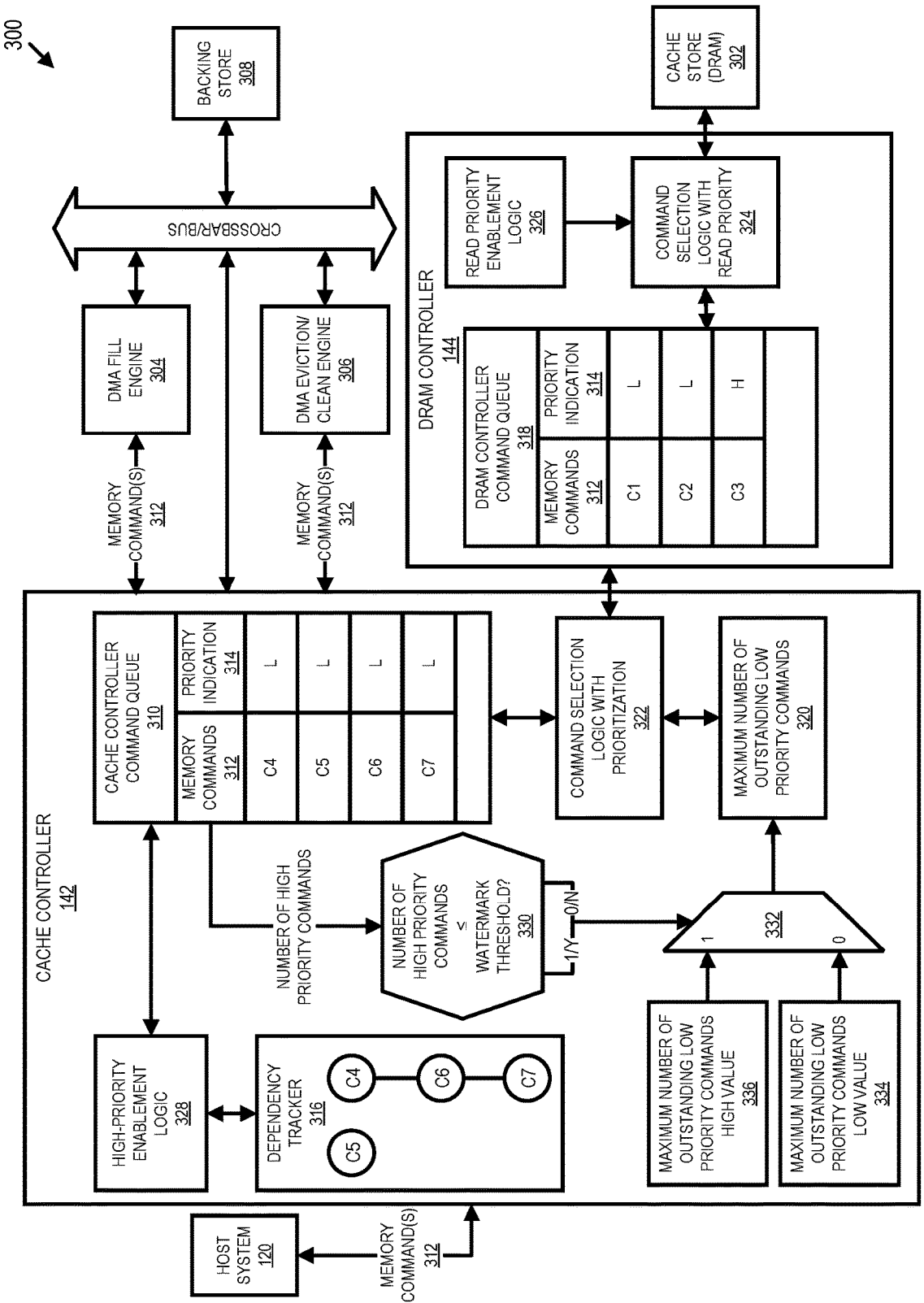
FIG. 3 is an example memory configuration, in accordance with some embodiments of the present disclosure.

The method 200 of FIGS. 2 and 2B, will be described in relation to several other supporting figures, including the memory configuration 300 of FIG. 3. However, the method 200 is not limited to the embodiments shown in these supporting figures, but instead these supporting figures are used for purposes of illustration.

Although described with the use of a DRAM controller, the memory configuration 300 and the computing system 100 generally includes a high latency memory and, comparatively, a low latency memory (i.e., the high latency memory has a higher latency than the low latency memory in relation to performing reads and writes). In the memory configuration 300, the memory device 130 (e.g., the backing store 308) is the high latency memory and memory device 140 is the low latency memory (e.g., the cache store 302). Accordingly, the use of particular memory types (e.g., DRAM) is for illustrative purposes.

As shown in FIG. 2A, the method 200 may commence at operation 202. At operation 202, the processing device determines if a memory command (sometimes referred to as a memory request, a command, or a request) has been received or otherwise detected. For example, in the memory configuration 300 of FIG. 3, the processing device can determine if a memory command 312 has been received by the cache controller 142. The memory command 312 can be an internally generated command (e.g., the memory command 312 is generated by the memory subsystem 110) or an externally generated command (e.g., the memory command 312 is received from a host system 120). For example, in relation to an internally generated command, the memory subsystem 110 may trigger (1) a fill operation in which data from the backing store 308 (e.g., the memory devices 130/140) is added to the cache store 302 and/or (2) an eviction or clean operation in which dirty data in the cache store 302 is evicted from the cache store 302 to the backing store 308. In one embodiment, the cache controller 142 can trigger (1) the Direct Memory Access (DMA) fill engine 304 to perform a fill operation, including causing the DMA fill engine 304 to pass a write memory command 312 to the cache controller 142 such that data from the backing store 308 can be written/filled into the cache store 302, and/or (2) the DMA eviction/clean engine 306 to perform an eviction or clean operation, including causing the DMA fill engine 304 to pass a read command to the cache controller 142 such that data from the cache store 302 is read and can be evicted and written to the backing store 308. In terms of externally generated memory commands 312, the host system 120 can transmit (1) a read memory command 312 to request data from the backing store 308, which can also be cached by the memory subsystem 110 (e.g., in the cache store 302) and/or (2) a write memory command 312 to request the writing of data to the backing store 308, which can also be cached by the memory subsystem 110 prior to writing to the backing store 308. In response to the processing device determining at operation 202 that a memory command 312 was received, the method 200 moves to operation 204.

At operation 204, the processing device adds the newly received memory command 312 to the cache controller command queue 310. In particular, the cache controller command queue 310 stores memory commands 312 that have not yet been issued/fulfilled and the processing device adds the newly received memory command 312 to the cache controller command queue 310 in the order the memory command 312 was received by cache controller 142. Accordingly, the cache controller command queue 310 includes received memory commands 312, which have not yet issued to the DRAM controller 144 for fulfillment, in the order the memory commands 312 were received. For instance, in the example of FIG. 3, the cache controller 142 received the command C4 prior to the command C5, the command C5 prior to the command C6, and the command C6 prior to the command C7. For purposes of illustration, the command C7 is the newly received memory command 312 that the processing device determined was received at operation 202 and the processing device added to the cache controller command queue 310 at operation 204.

In addition to storing memory commands 312 in the order in which they were received, the cache controller command queue 310 also tracks a priority of pending/outstanding memory commands 312. In particular, the cache controller command queue 310 includes a priority indication 314 that indicates whether an associated memory command 312 is of a high priority (H) or of a low priority (L). As will be discussed in greater detail below, high priority memory commands 312 are generally selected for issuance/fulfillment to the DRAM controller 144 prior to low priority memory commands 312. In one embodiment, as memory commands 312 are added to the cache controller command queue 310 at operation 204, the memory commands 312 are initially assigned a low priority. However, as described below, in other embodiments, the processing device can set the priority of the newly received memory command 312 at a later time.

At operation 206, the processing device updates a dependency tracker 316 based on the newly received memory command 312, if applicable. In particular, the dependency tracker 316 tracks the interdependency of all pending/outstanding memory commands 312 (i.e., yet to be issued and fulfilled memory commands 312). In one embodiment, the processing device detects dependency between commands when the commands target the same sector, line, or other unit of access of the cache store 302 or backing store 308. In response to the dependency tracker 316 determining that the newly received memory command 312 is dependent on a previously received memory command 312, the dependency tracker 316 records this dependency. For example, as shown in FIG. 3, the memory commands C4, C5, C6, and C7 are pending memory commands 312 and as stated above, the memory command C7 was newly received. In this example, the memory command C5 does not share an interdependency with any other memory command 312 (i.e., the memory command C5 does not depend from another memory command 312 and another memory command 312 does not depend from the memory command C5). In contrast, the memory commands C4, C6, and C7 are interdependent. In one embodiment, the dependency tracker 316 can determine dependence based on a region or portion of (1) the cache store 302 or (2) the backing store 308 associated with the memory commands 312. For example, the cache store 302 can be a multiway associative cache. In this example, although the memory command C4 and the memory command C6 may not reference the same address (either different logical and/or physical addresses), both memory commands 312 may be associated with a same region (sometimes referred to as a sector or a unit of access) of the cache store 302 (e.g., the addresses referenced by the memory commands C4 and C6 are associated with at least a partially overlapping region of the cache store 302). For example, this shared region of the cache store 302 can be one or more cache lines. The dependency tracker 316 indicates that the memory command C6 is dependent on the memory command C4 based on this association/similarity. Likewise, upon the dependency tracker 316 determining that the memory command C7 is associated with a same region of the cache store 302 as the memory commands C4 and/or C6, the dependency tracker 316 indicates that the memory command C7 is interdependent with the memory command C4 and/or C6. For example, as shown in FIG. 3, the memory command C7 is dependent on the memory command C6, which is dependent on the memory command C4.

At operation 208, the processing device determines if the newly received memory command 312 is a read memory command that has been received from the host system 120. As described above, the newly received memory command 312 can be of multiple types and from one of multiple sources. For example, the newly received memory command 312 can either be a read memory command or a write memory command. Further, the newly received memory command 312 can be received from a host system 120 or can be internally generated by the memory subsystem 110 (e.g., as part of a fill, eviction, or clean operation). In response to the processing device determining that the newly received memory command 312 is not a read memory command 312 from the host system 120 (e.g., is a write memory command 312 or is an internally generated read memory command 312), the method 200 moves to operation 210.

At operation 210, the processing device sets the priority of the newly received memory command 312 to a low priority. In particular, the processing device sets the priority indication 314 for the newly received memory command 312 in the cache controller command queue 310 to a low priority at operation 210. For example, FIG. 3 shows the newly received memory command C7 when this memory command 312 is not a read memory command 312 from the host system 120 and consequently the processing device sets the priority of the memory command C7 to a low priority at operation 210 (i.e., the processing device sets the priority indication 314 for the memory command C7 to a low priority (L)). As will be described below, this low priority may be changed based on dependencies of a later received high priority memory command 312 that depends from the memory command C7.

Returning to operation 208, in response to the processing device determining that the newly received memory command 312 is a read memory command 312 from the host system 120, the method 200 moves to operation 212. At operation 212, the processing device sets the priority of the newly received memory command 312 to a high priority. In particular, the processing device sets the priority indication 314 for the newly received memory command 312 in the cache controller command queue 310 to a high priority (H) at operation 212. This high priority will help ensure that read memory commands 312 from the host system 120 are generally prioritized over lower priority memory commands 312, which increases performance relative to the host system 120 by reducing latency for the fulfillment of the read memory commands 312 originating from host systems 120.

Figure 4:
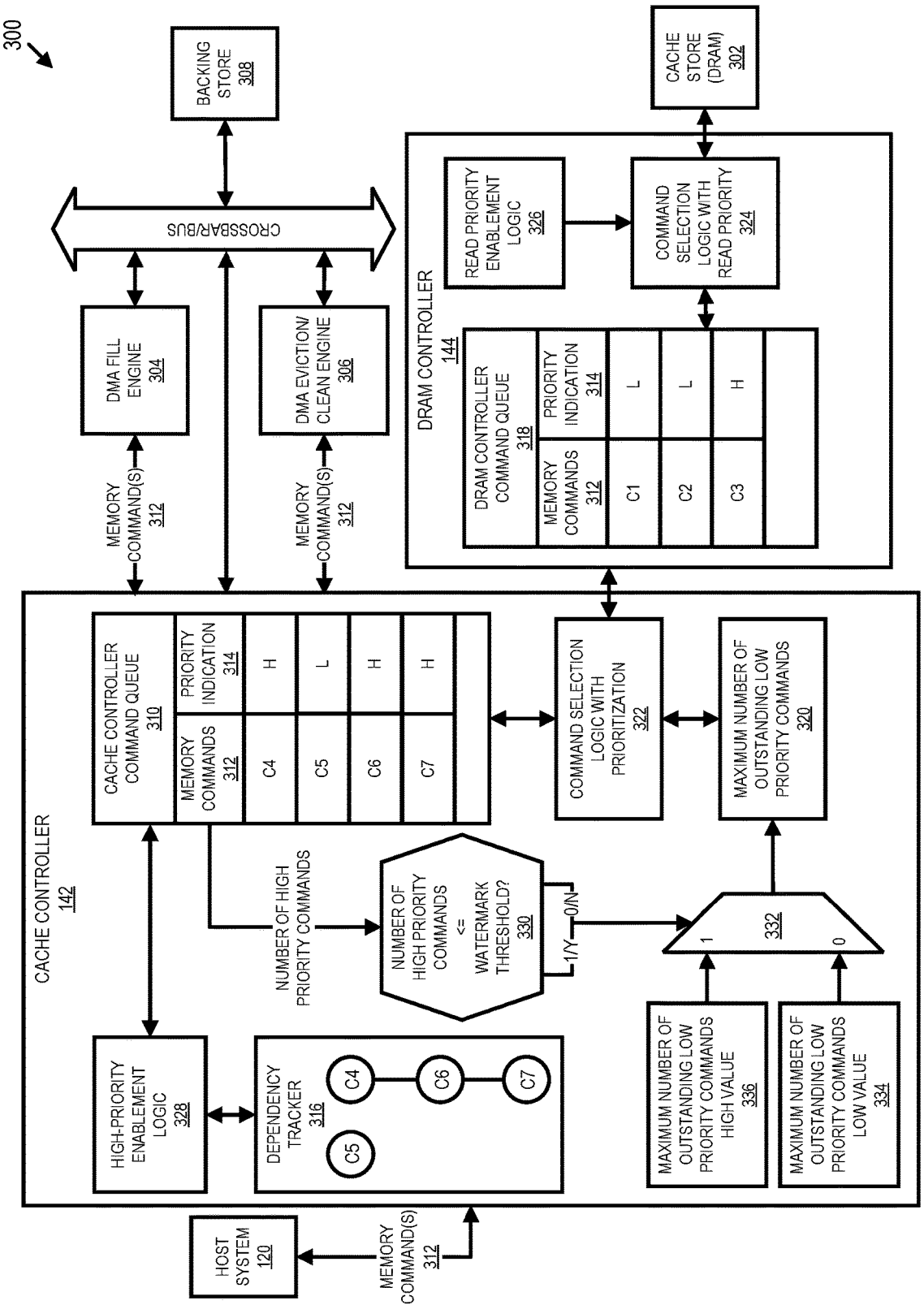
FIG. 4 is the example memory configuration following the update of priority indications based on dependencies, in accordance with some embodiments of the present disclosure.

At operation 214, the processing device sets pending/outstanding memory commands 312 in the cache controller command queue 310 from which the newly received memory command 312 depends, which was set to a high priority at operation 212, also to a high priority. In particular, the processing device (e.g., the high priority enablement logic 328) sets the priority indication 314 for pending memory commands 312 in the cache controller command queue 310 from which the newly received memory command 312 depends to a high priority (H) at operation 214. For example, when the newly received memory command 312 is the memory command C7, and the memory command C7 is a read memory command 312 from the host system 120, such that the processing device sets the priority indication 314 for the memory command C7 to a high priority at operation 212, the processing device sets a priority indication 314 for the memory commands C4 and C6 also to a high priority at operation 214, as shown in FIG. 4.

Following operation 214, operation 210, or following the processing device determining that a memory command 312 was not received at operation 202, the method 200 moves to operation 216. At operation 216, the processing device determines if a triggering event has occurred, which would indicate the need to issue a memory command 312 from the cache controller 142 to the DRAM controller 144. For example, the triggering event can be the passage of a certain time period such that the cache controller 142 issues a memory command 312 to the DRAM controller 144 at a prescribed interval. In another embodiment, the triggering event can be a state of the DRAM controller command queue 318, which stores memory commands 312 following their issuance from the cache controller 142 but before the memory commands 312 are fulfilled (i.e., prior to the command selection logic with read priority 324 reading data from or writing data to the cache store 302 in accordance with a corresponding memory command 312). For example, detecting the triggering event can include the processing device detecting that the DRAM controller command queue 318 has available entries/space for additional memory commands 312.

Although described above as the operation 216 occurring after or as a result of completion of one of the operations 202, 210, and 214, the operation 216 and one or more of the subsequent operations 218-224 can be performed independently of the operations 202-214, including the operations 202, 210, and/or 214. In this fashion, the operations 202-214 are performed independently, including in possibly at least partially overlapping time periods, with the operations 216-224, which will be further described below.

In response to the processing device determining at operation 216 that a triggering event has not occurred, the method 200 returns to operation 202 to determine whether a memory command 312 has been received. Conversely, in response to the processing device determining at operation 216 that a triggering event has occurred, the method 200 moves to operation 218.

At operation 218, the processing device determines if the last one or more memory commands 312 issued by the cache controller 142 to the DRAM controller 144 was a high priority memory command 312. For example, the cache controller 142 can store and maintain a priority indication 314 along with each of one or more memory commands 312 issued by the cache controller 142 to the DRAM controller 144. For instance, a priority indication memory can include a single bit that is set to one value/state (e.g., set or the value "1") to indicate that the last memory command 312 issued by the cache controller 142 to the DRAM controller 144 was a high priority memory command 312 or is set to a another value/state (e.g., unset or the value "0") to indicate that the last memory command 312 issued by the cache controller 142 to the DRAM controller 144 was a low priority memory command 312. This check allows the processing device to rotate issuance of high and low priority memory commands 312 when appropriate. In response to the processing device determining that the last memory command 312 issued by the cache controller 142 to the DRAM controller 144 was a high priority memory command 312, the method 200 moves to operation 219A.

At operation 219A, the processing device determines if a number of high priority memory commands 312 in the cache controller command queue 310 is less than, equal to, or otherwise meets a watermark threshold (sometimes referred to as a high priority command threshold). For example, when the watermark threshold is set to three, the processing device (e.g., the decision block 330) determines that for the memory configuration 300 shown in FIG. 4, the number of high priority memory commands 312 in the cache controller command queue 310 is equal to the watermark threshold since there are three high priority memory commands 312 in the cache controller command queue 310 at this point. However, when the watermark threshold is set to two, the processing device determines that for the memory configuration 300 shown in FIG. 4, the number of high priority memory commands 312 in the cache controller command queue 310 is not less than or equal to the watermark threshold since there are three high priority memory commands 312 in the cache controller command queue 310 at this point. In response to the processing device determining that the number of high priority memory commands 312 in the cache controller command queue 310 is not less than or equal to a watermark threshold (i.e., the number of high priority memory commands 312 in the cache controller command queue 310 is greater than the watermark threshold), the method 200 moves to operation 219B.

At operation 219B, the processing device sets the maximum number of outstanding low priority memory commands 320, which indicates the maximum number of low priority memory commands 312 allowed in the DRAM controller command queue 318 at any point of time, to a maximum number of outstanding low priority memory commands low value 334 (i.e., a predefined low value). In particular, the multiplexer 332 can select the maximum number of outstanding low priority memory commands low value 334 in response to an input from the decision block 330 (e.g., 0/N) for setting the maximum number of outstanding low priority memory commands 320.

Returning to operation 219A, in response to the processing device determining that the number of high priority memory commands 312 in the cache controller command queue 310 is less than or equal to a watermark threshold, the method 200 moves to operation 219C. At operation 219C, the processing device sets the maximum number of outstanding low priority memory commands 320 to a maximum number of outstanding low priority memory commands high value 336 (i.e., a predefined high value). In particular, the multiplexer 332 can select the maximum number of outstanding low priority memory commands high value 336 in response to an input from the decision block 330 (e.g., 1/Y) for setting the maximum number of outstanding low priority memory commands 320. In this configuration, the value 334 is less than the value 336).

By setting the maximum number of outstanding low priority memory commands 320 as described above, the memory subsystem 110 allows (1) more low priority memory commands 312 into the DRAM controller command queue 318 when the cache controller command queue 310 has comparatively fewer high priority memory commands 312 and (2) fewer low priority memory commands 312 into the DRAM controller command queue 318 when the cache controller command queue 310 has comparatively more high priority memory commands 312. In this fashion, high priority memory commands 312 are not ignored and are given priority when there is a sufficient number ready for issuance to the DRAM controller command queue 318. However, low priority memory commands 312 are not ignored when there are few high priority memory commands 312 ready for issuance to the DRAM controller command queue 318.

Figure 5:
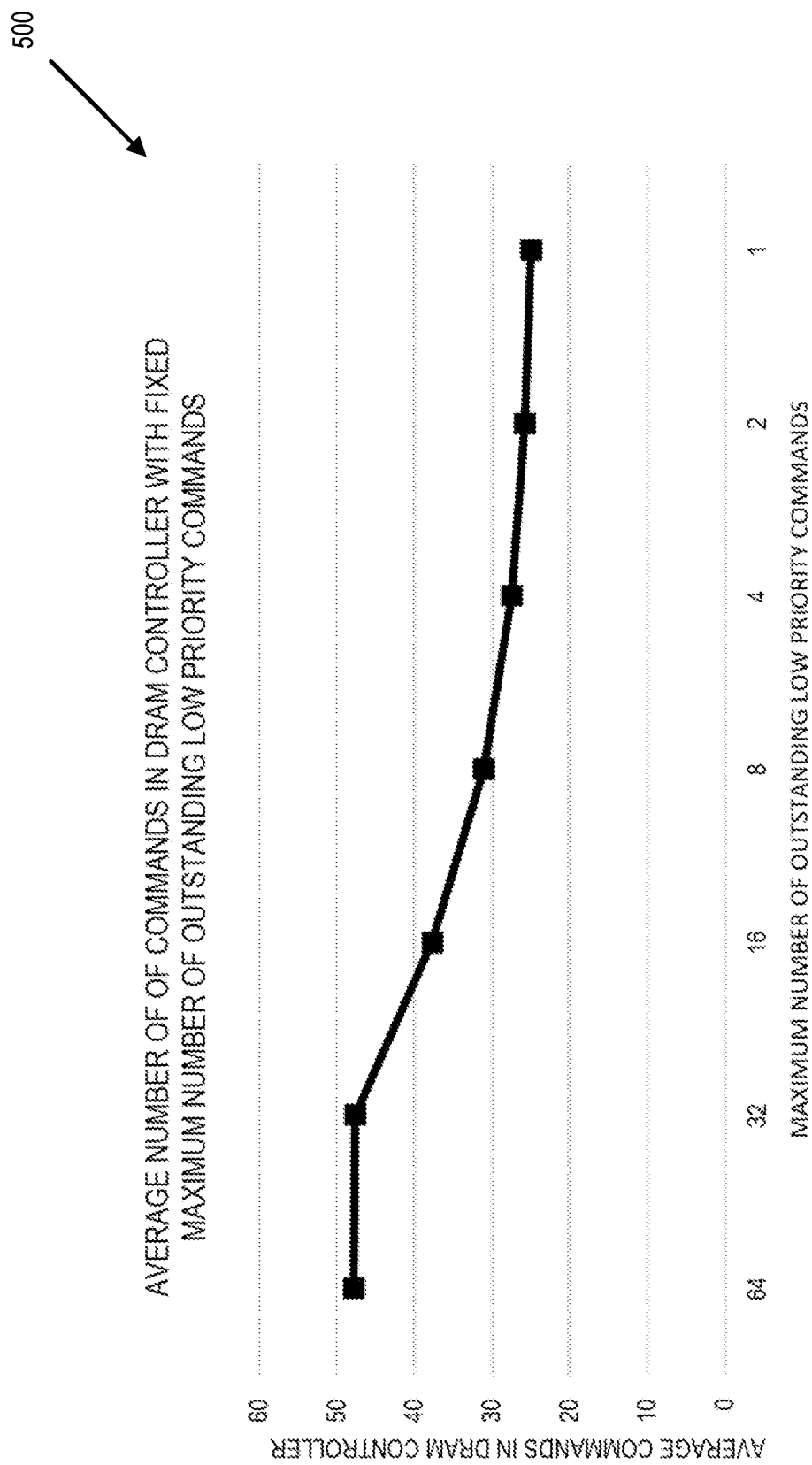
FIG. 5 shows a graph of simulation results for the average number of memory commands in a dynamic random access memory (DRAM) controller command queue when the value for the maximum number of outstanding low priority memory commands is fixed, in accordance with some embodiments of the present disclosure.
Figure 6:
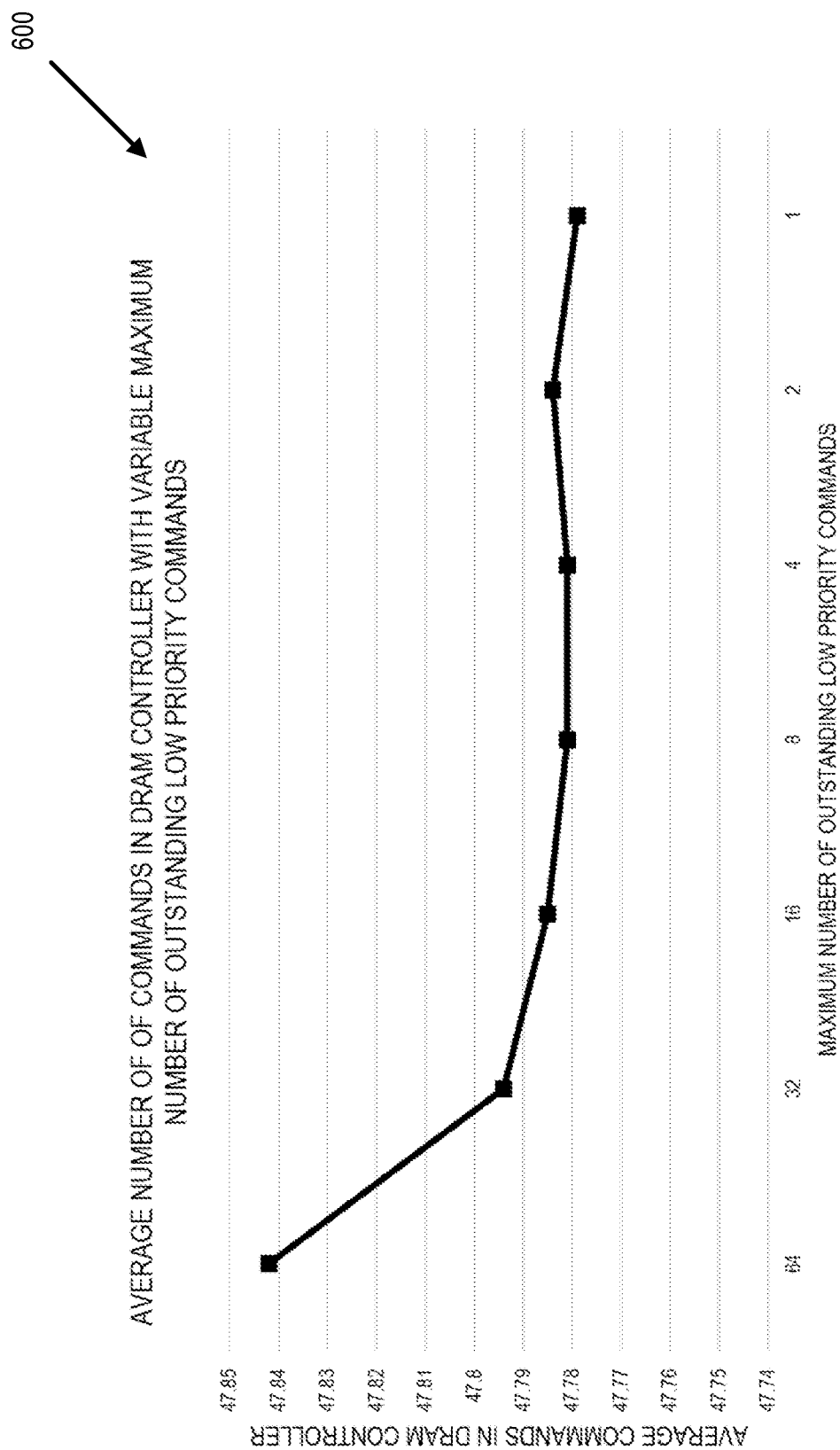
FIG. 6 shows a graph of simulation results for the average number of memory commands in a dynamic random access memory (DRAM) controller command queue when the value for the maximum number of outstanding low priority memory commands is variable, in accordance with some embodiments of the present disclosure.

By allowing the value for the maximum number of outstanding low priority memory commands 320 to be variable, the method 200 permits a greater utilization of the DRAM controller command queue 318. In particular, FIG. 5 shows a graph/chart 500 of simulation results for the average number of memory commands 312 in the DRAM controller command queue 318 when the value for the maximum number of outstanding low priority memory commands 320 is fixed. As shown in FIG. 5, the average number of memory commands 312 in the DRAM controller command queue 318 can fluctuate between approximately 48 memory commands 312 and 25 memory commands 312. In comparison, FIG. 6 shows a graph 600 of simulation results for the average number of memory commands 312 in the DRAM controller command queue 318 when the value for the maximum number of outstanding low priority memory commands 320 is variable. As shown in FIG. 6, the average number of memory commands 312 in the DRAM controller command queue 318 has a comparatively smaller fluctuation. In particular, the average number of memory commands 312 in the DRAM controller command queue 318 remains stable at approximately 47 or 48 memory commands 312. Thus, by intelligently varying the maximum number of outstanding low priority memory commands 320 permitted in the DRAM controller command queue 318 as described herein, the method 200 can maximize utilization of the DRAM controller command queue 318.

Following operation 219B or operation 219C, the method 200 moves to operation 220. At operation 220, the processing device determines whether a number of low priority memory commands 312 in the DRAM controller command queue 318 satisfied a threshold (e.g., is equal to a maximum number of outstanding low priority memory commands 320). In particular, the maximum number of outstanding low priority commands 320 indicates the maximum number of low priority memory commands 312 allowed in the DRAM controller command queue 318 at any point of time. As shown in FIG. 3 and in FIG. 4, the DRAM controller command queue 318 is a queue similar to the cache controller command queue 310. In particular, the DRAM controller command queue 318 includes memory commands 312 stored in the order they were received by the cache controller 142 and a priority indication 314. As will be described below, as memory commands 312 are issued by the command selection logic with prioritization 322 of the cache controller 142 to the DRAM controller 144, the memory commands 312 are added from the cache controller command queue 310 to the DRAM controller command queue 318, including the associated priority indication 314. Using the maximum number of outstanding low priority memory commands 320 as a threshold ensures that a minimum number of high priority memory commands 312 can enter or otherwise be within the DRAM controller command queue 318 despite a large number of preceding low priority memory commands 312. For example, based on the example shown in FIG. 3 or the example shown in FIG. 4, when the maximum number of outstanding low priority memory commands 320 is set to three, the processing device determines at operation 220 that the number of low priority memory commands 312 in the DRAM controller command queue 318 is not equal to a maximum number of outstanding low priority memory commands 320. However, when the maximum number of outstanding low priority memory commands 320 is set to two, the processing device determines at operation 220 that the number of low priority memory commands 312 in the DRAM controller command queue 318 is equal to the maximum number of outstanding low priority memory commands 320.

Figure 7:
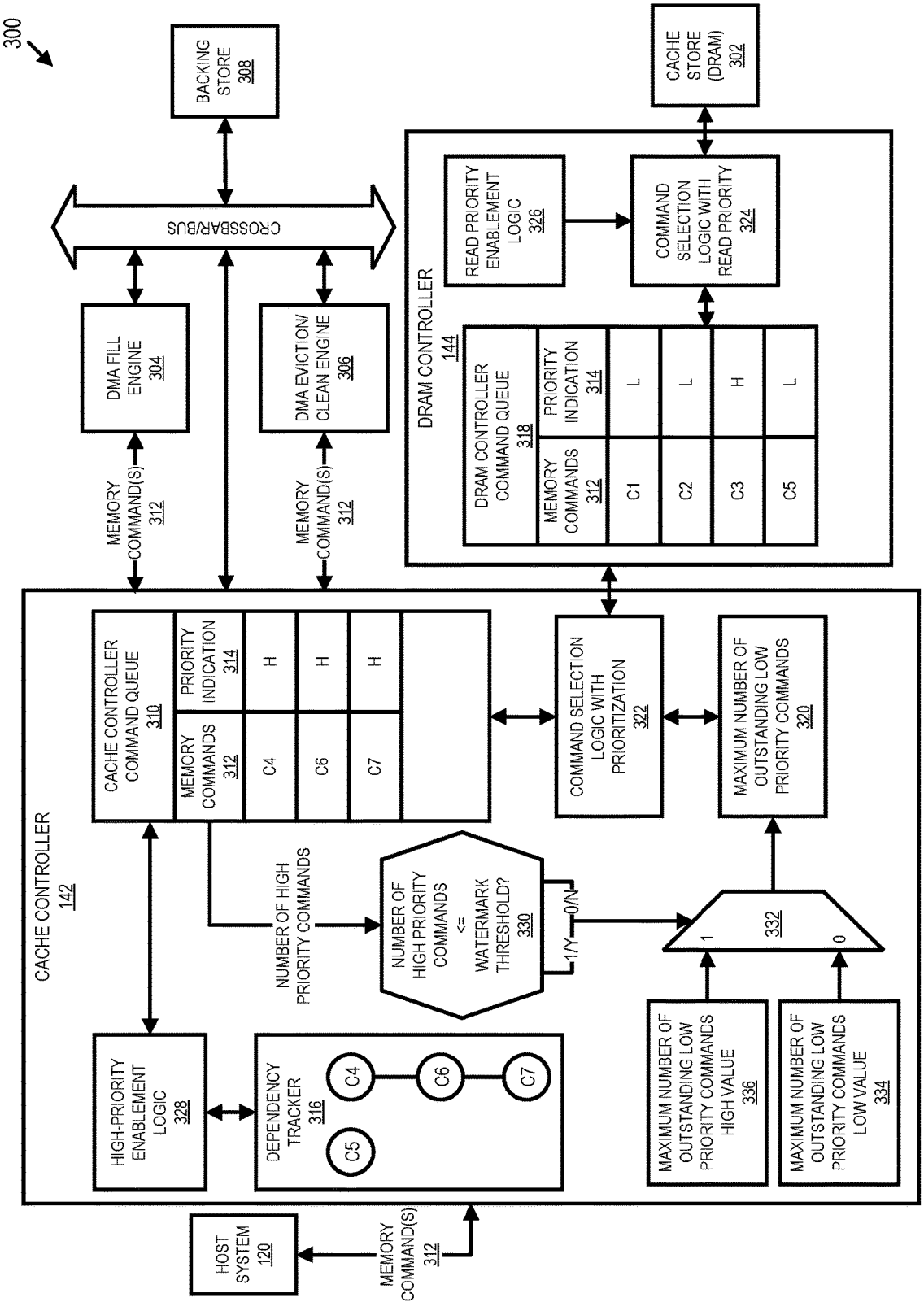
FIG. 7 is the example memory configuration following issuance of a low priority memory command to a DRAM controller, in accordance with some embodiments of the present disclosure.

In response to the processing device determining that the number of low priority memory commands 312 in the DRAM controller command queue 318 does not satisfy the threshold (e.g., is not equal to a maximum number of outstanding low priority commands 320), the method 200 moves to operation 222. At operation 222, the processing device issues the oldest low priority memory command 312 from the cache controller command queue 310 of the cache controller 142 to the DRAM controller command queue 318 of the DRAM controller 144. For instance, in the example of FIG. 4, the command selection logic with prioritization 322 issues the memory command C5 to the DRAM controller command queue 318 at operation 222 as shown in FIG. 7. Following operation 222, the method 200 may return to operation 202.

Figure 8:
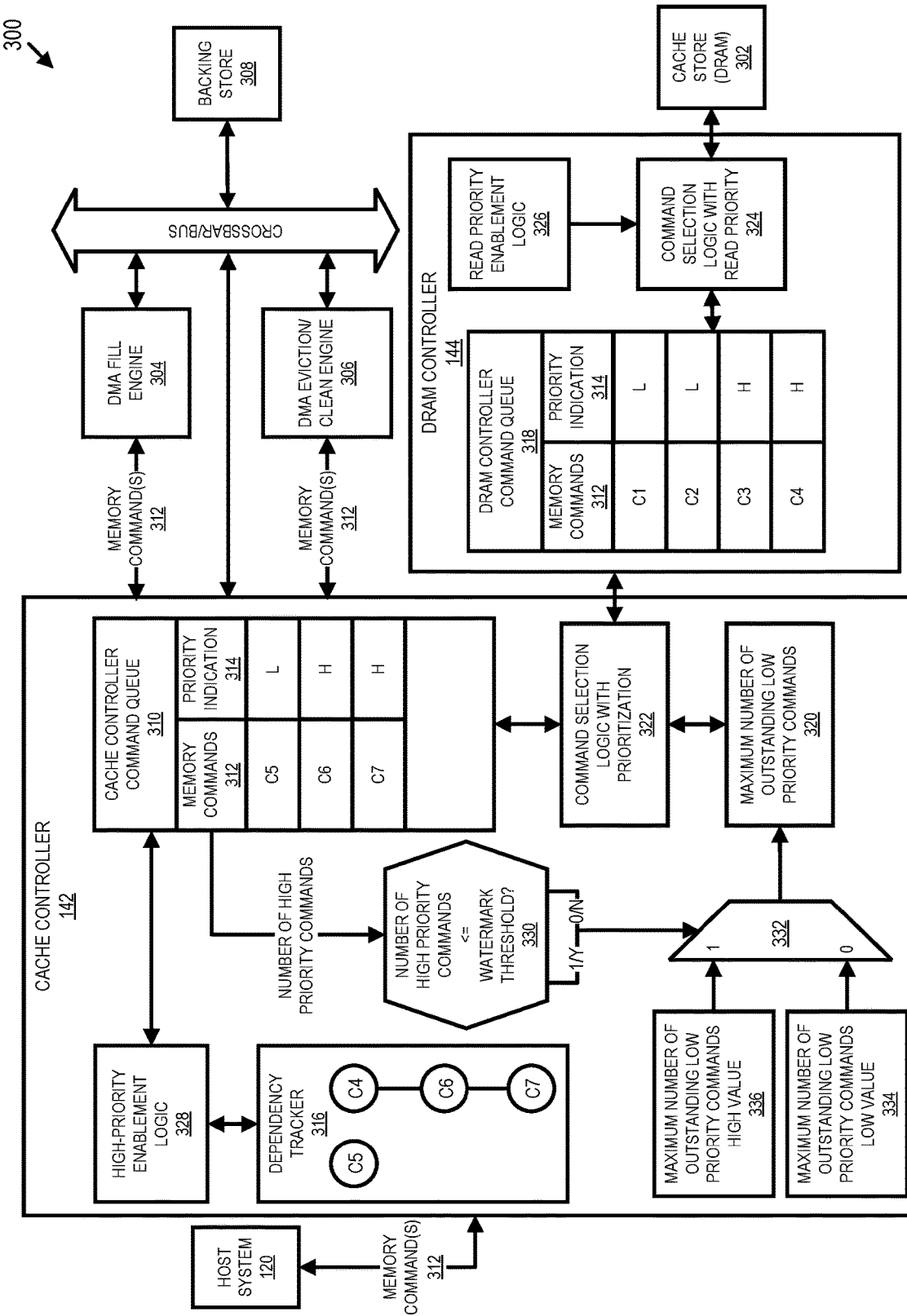
FIG. 8 is the example memory configuration following issuance of a high priority memory command to a DRAM controller, in accordance with some embodiments of the present disclosure.

In response to the processing device determining that (1) the number of low priority memory commands 312 in the DRAM controller command queue 318 satisfies a threshold (e.g., is equal to a maximum number of outstanding low priority commands 320) or (2) the last memory command 312 issued by the cache controller 142 to the DRAM controller 144 was not a high priority memory command 312 (i.e., the last memory command 312 issued by the cache controller 142 to the DRAM controller 144 was a low priority memory command 312), the method 200 moves to operation 224. At operation 224, the processing device issues the oldest high priority memory command 312 from the cache controller command queue 310 of the cache controller 142 to the DRAM controller command queue 318 of the DRAM controller 144. For example, in the example of FIG. 4, the command selection logic with prioritization 322 issues the memory command C4 to the DRAM controller command queue 318 at operation 224 as shown in FIG. 8. Following operation 224, the method 200 may return to operation 202.

Following either issuance of a low priority memory command 312 at operation 222 or a high priority memory command 312 at operation 224, the processing device issues/fulfills commands 312 from the DRAM controller command queue 318 with prioritization for high priority memory commands 312. In particular, the command selection with read priority 324 issues memory commands 312 from the DRAM controller command queue 318 with prioritization for commands 312 in the DRAM controller command queue 318 that have a priority indication 314 that indicates that the memory command 312 is a high priority memory command 312. Issuing commands from the DRAM controller command queue 318 can include (1) reading data from the cache store 302, such that the data can be returned to a requestor of a corresponding read memory command 312 (e.g., the host system 120 or the DMA eviction/clean engine 306) or (2) writing data to the cache store 302 to fulfill a write memory command 312 (e.g., a write memory command 312 from the host system 120 or the DMA fill engine 304). In one embodiment, the read priority enablement logic 326 selectively enables and disables read priority in the command selection with read priority 324. In particular, the read priority enablement logic 326 can enable the command selection with read priority 324 to prioritize high priority memory commands 312 over low priority memory commands 312 in the DRAM controller 144 or disable this feature such that the command selection with read priority 324 issues memory commands 312 in the order the memory commands 312 are received from the cache controller 142 or the overall age of the memory commands 312 (i.e., the order the memory commands 312 are received by the cache controller 142). In one embodiment, the read priority enablement logic 326 is selectively enabled based on each received memory command 312. For example, the cache controller 142 can set one or more bits/fields in each memory command 312 passed to the DRAM controller 144 to indicate whether the read priority enablement logic 326 is enabled or disabled for the memory command 312.

Figure 9:
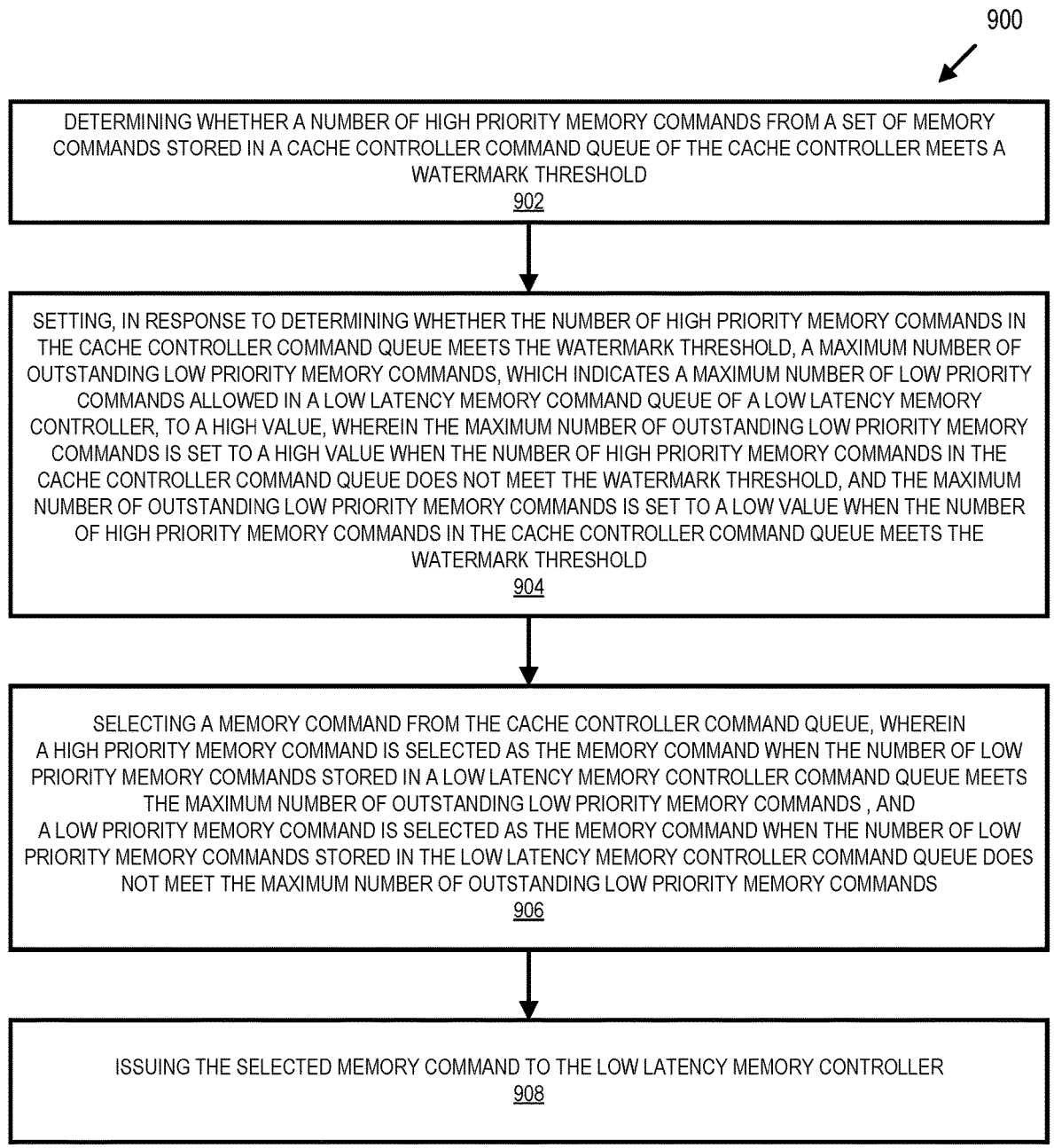
FIG. 9 is a flow diagram of another example method to manage the issuance and fulfillment of memory commands, in accordance with other embodiments of the present disclosure.

Turning to FIG. 9, this figure shows a flow diagram of an example method 900 to manage the issuance and fulfillment of memory commands, in accordance with other embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the cache controller 142 and/or the DRAM controller 144 of FIG. 1. Although shown in a particular sequence or order, unless otherwise specified, the order of the processes/operations can be modified. Thus, the illustrated embodiments should be understood only as examples, and the illustrated processes/operations can be performed in a different order, and some processes/operations can be performed in parallel. Additionally, one or more processes/operations can be omitted in various embodiments. Thus, not all processes/operations are required in every embodiment. Other flows are possible.

As shown in FIG. 9, the method 900 can commence at operation 902 with the processing device determining whether a number of high priority memory commands 312 from a set of memory commands 312 stored in a cache controller command queue 310 of the cache controller 142 meets a watermark threshold (e.g., is less than or equal to a watermark threshold). In particular, the watermark threshold can be used to indicate whether there are a relatively large number of high priority memory commands 312 in the cache controller command queue 310 and awaiting issuance to the DRAM controller 144 or a relatively low number of high priority memory commands 312 in the cache controller command queue 310.

At operation 904, the processing device sets, in response to determining whether the number of high priority memory commands 312 in the cache controller command queue 310 meets the watermark threshold, the maximum number of outstanding low priority memory commands 320, which indicates a maximum number of low priority commands allowed in a low latency memory command queue of a low latency memory controller (e.g., the DRAM command queue 318 of the DRAM controller 144). The processing device sets the maximum number of outstanding low priority memory commands 320 to a high value when the number of high priority memory commands in the cache controller command queue 310 does not meet the watermark threshold and the processing device sets the maximum number of outstanding low priority memory commands 320 to a low value when the number of high priority memory commands in the cache controller command queue 310 meets the watermark threshold.

At operation 906, the processing device selects a memory command 312 from the cache controller command queue 310. In particular, a high priority memory command 312 is selected as the selected memory command 312 when the number of low priority memory commands 312 stored in the low latency memory controller command queue meets the maximum number of outstanding low priority memory commands 320 and a low priority memory command 312 is selected as the selected memory command 312 when the number of low priority memory commands 312 stored in the low latency memory controller command queue does not meet the maximum number of outstanding low priority memory commands 320.

At operation 908, the processing device issues the selected memory command 312 to the low latency memory controller. These memory commands 312 will be selectively fulfilled (e.g., read data or write data) based on their priority.

Figure 10:
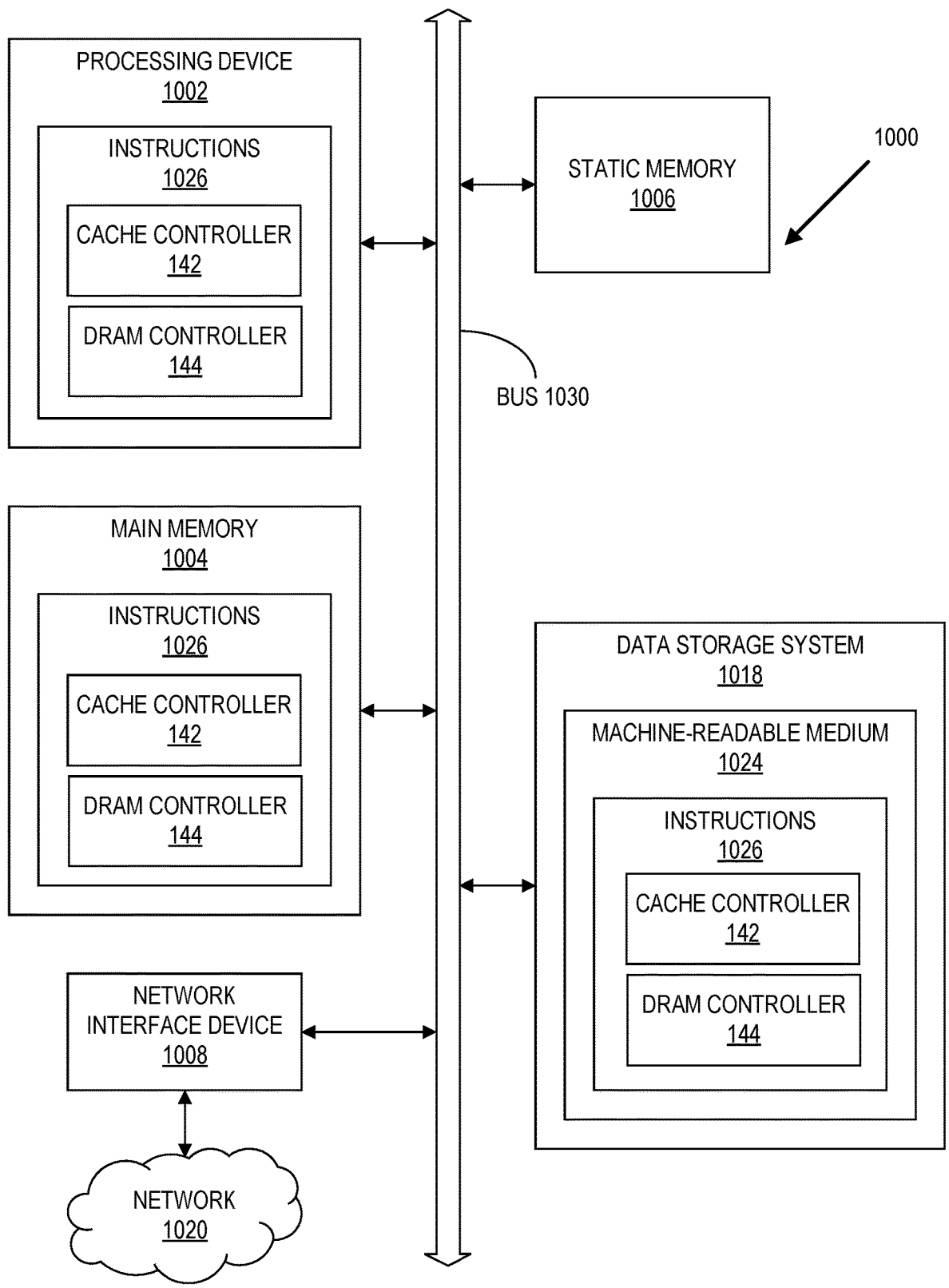
FIG. 10 is a block diagram of an example computer system in which embodiments of the present disclosure may operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the cache controller 142 and/or the DRAM controller 144 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory subsystem 110 of FIG. 1.

In one embodiment, the instructions 1026 include instructions to implement functionality corresponding to a cache controller and/or a DRAM controller (e.g., the cache controller 142 and/or the DRAM controller 144 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 900 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining whether a number of high priority memory commands from a set of memory commands stored in a cache controller command queue meets a first threshold;
   setting, in response to determining whether the number of high priority memory commands in the cache controller command queue meets the first threshold, a second threshold, which indicates a maximum number of low priority commands allowed in a low latency memory command queue of a low latency memory controller, wherein:
      the second threshold is set to a first value when the number of high priority memory commands in the cache controller command queue does not meet the first threshold, and
      the second threshold is set to a second value when the number of high priority memory commands in the cache controller command queue meets the first threshold;
   selecting a first memory command from the cache controller command queue, wherein
      a high priority memory command is selected as the first memory command when the number of low priority memory commands stored in the low latency memory controller command queue meets the second threshold, and
      a low priority memory command is selected as the first memory command when the number of low priority memory commands stored in the low latency memory controller command queue does not meet the second threshold; and
   issuing the first memory command to the low latency memory controller.

2. The method of claim 1, wherein the first value is greater than the second value.

3. The method of claim 2, further comprising:
   receiving a second memory command;
   adding the second memory command to the cache controller command queue;
   setting a priority of the second memory command in the cache controller command queue to either a high priority or a low priority based on one or more of (1) whether the second memory command is a read memory command or a write memory command and (2) an origin of the second memory command; and
   determining a dependency of the second memory command to one or more memory commands in the set of memory commands stored in the cache controller command queue.

4. The method of claim 3, further comprising:
   adjusting a priority of the one or more memory commands based on the determined dependency with the second memory command.

5. The method of claim 4, wherein adjusting a priority of the one or more memory commands based on the determined dependency includes setting a priority of each memory command in the one or more memory commands to a high priority when the second memory command has a high priority.

6. The method of claim 4, wherein determining the dependency between the second memory command and the one or more memory commands includes determining that the second memory command and the one or more memory commands are associated with a same region of a cache store or a set of memory devices.

7. The method of claim 1, further comprising:
   determining that a previous memory command issued to the low latency memory controller is a high priority memory command,
   wherein the determining whether the number of high priority memory commands from the set of memory commands stored in the cache controller command queue meets the first threshold is performed in response to determining that the last issued memory command is a high priority memory command.

8. The method of claim 1, further comprising:
   fulfilling, by the low latency memory controller, a third memory command from the low latency memory controller command queue based on a priority associated with each of the memory commands in the low latency memory controller command queue such that high priority memory commands are prioritized over low priority memory commands in the low latency memory controller command queue.

9. A non-transitory computer-readable storage medium comprising instructions that, when executed by a processing device, cause the processing device to:
   determine whether a number of high priority memory commands from a set of memory commands stored in a cache controller command queue meets a first threshold;
   set, in response to determining whether the number of high priority memory commands in the cache controller command queue meets the first threshold, a second threshold, which indicates a maximum number of low priority commands allowed in the low latency memory command queue of a low latency memory controller, wherein:
      the second threshold is set to a first value when the number of high priority memory commands in the cache controller command queue does not meet the first threshold, and
      the second threshold is set to a second value when the number of high priority memory commands in the cache controller command queue meets the first threshold;
   select a first memory command from the cache controller command queue, wherein
      a high priority memory command is selected as the first memory command when the number of low priority memory commands stored in a low latency memory controller command queue meets the second threshold, and
      a low priority memory command is selected as the first memory command when the number of low priority memory commands stored in the low latency memory controller command queue does not meet the second threshold; and
   issue the first memory command to the low latency memory controller.

10. The non-transitory computer-readable storage medium of claim 9, wherein the first value is greater than the second value.

11. The non-transitory computer-readable medium of claim 10, wherein the processing device is further to:
receive a second memory command;
add the second memory command to the cache controller command queue;
set a priority of the second memory command in the cache controller command queue to either a high priority or a low priority based on one or more of (1) whether the second memory command is a read memory command or a write memory command and (2) an origin of the second memory command; and
determine a dependency of the second memory command to one or more memory commands in a first set of memory commands stored in the cache controller command queue.

12. The non-transitory computer-readable medium of claim 11, wherein the processing device is further to:
adjust a priority of the one or more memory commands based on the determined dependency with the second memory command.

13. The non-transitory computer-readable medium of claim 12, wherein adjusting a priority of the one or more memory commands based on the determined dependency includes setting a priority of each memory command in the one or more memory commands to a high priority when the second memory command has a high priority.

14. The non-transitory computer-readable medium of claim 12, wherein determining the dependency between the second memory command and the one or more memory commands includes determining that the second memory command and the one or more memory commands are associated with a same region of a cache store or a set of memory devices.

15. The non-transitory computer-readable medium of claim 9, wherein the processing device is further to:
determine that a previous memory command issued to the low latency memory controller is a high priority memory command,
wherein the determining whether the number of high priority memory commands stored in the cache controller command queue meets the first threshold is performed in response to determining that the last issued memory command is a high priority memory command.

16. The non-transitory computer-readable medium of claim 9, wherein the processing device is further to:
fulfill a third memory command from a second set of memory commands based on a priority associated with each of the memory commands in the second set of memory commands such that high priority memory commands are prioritized over low priority memory commands in the second set of memory commands.

17. A system comprising:
a memory device; and
a processing device, operatively coupled with the memory device, to:
determine whether a number of high priority memory commands from a set of memory commands stored in a cache controller command queue meets a first threshold;
set, in response to determining whether the number of high priority memory commands in the cache controller command queue meets the first threshold, a second threshold, which indicates a maximum number of low priority commands allowed in the low latency memory command queue of a low latency memory controller, wherein:
the second threshold is set to a first value when the number of high priority memory commands in the cache controller command queue does not meet the first threshold, and
the second threshold is set to a second value when the number of high priority memory commands in the cache controller command queue meets the first threshold; and
select a memory command from the cache controller command queue, wherein a high priority memory command is selected as the memory command when the number of low priority memory commands stored in a low latency memory controller command queue meets the second threshold.

18. The system of claim 17, wherein a low priority memory command is selected as the memory command when the number of low priority memory commands stored in a low latency memory controller command queue does not meet the second threshold.

19. The system of claim 17, wherein the first value is greater than the second value.

20. The system of claim 17, wherein the processing device is further to:
issue the memory command to the low latency memory controller.

* * * * *